(12) United States Patent
Schein et al.

(10) Patent No.: US 8,644,193 B2
(45) Date of Patent: Feb. 4, 2014

(54) METHOD, SYSTEM AND DEVICE FOR CONFIGURING TOPOLOGY OR A WIRELESS NETWORK

(75) Inventors: Brett Schein, San Jose, CA (US); Sayandev Mukherjee, Santa Clara, CA (US); Murari Srinivasan, Palo Alto, CA (US)

(73) Assignee: SpiderCloud Wireless, Inc., San Jose, CA (US)

( * ) Notice: Subject to any disclaimer, the term of this patent is extended or adjusted under 35 U.S.C. 154(b) by 296 days.

(21) Appl. No.: 12/957,181

(22) Filed: Nov. 30, 2010

(65) Prior Publication Data

US 2011/0128890 A1 Jun. 2, 2011

Related U.S. Application Data

(60) Provisional application No. 61/265,700, filed on Dec. 1, 2009.

(51) Int. Cl.
*H04L 12/28* (2006.01)

(52) U.S. Cl.
USPC ......................................................... 370/255

(58) Field of Classification Search
USPC ...................................... 370/255, 241.1, 312
See application file for complete search history.

(56) References Cited

U.S. PATENT DOCUMENTS

| 5,542,111 | A | 7/1996 | Ivanov et al. |
| 6,993,334 | B2 | 1/2006 | Andrus et al. |
| 2006/0089964 | A1 | 4/2006 | Pandey et al. |
| 2006/0121946 | A1 | 6/2006 | Walton et al. |
| 2007/0195908 | A1 | 8/2007 | Attar et al. |
| 2007/0213058 | A1 | 9/2007 | Shaheen |
| 2007/0291770 | A1 | 12/2007 | Kitazoe |
| 2008/0171553 | A1 | 7/2008 | Ren et al. |
| 2009/0265542 | A1 | 10/2009 | Khetawat et al. |

FOREIGN PATENT DOCUMENTS

| WO | WO-2009/036497 | 3/2009 |
| WO | WO-2009/128656 | 10/2009 |

OTHER PUBLICATIONS

International Search Report for PCT Application No. PCT/US10/58427 dated Feb. 3, 2011.
International Search Report for PCT Application No. PCT/US10/58436 dated Feb. 3, 2011.

*Primary Examiner* — Man Phan
*Assistant Examiner* — Kevin Lee
(74) *Attorney, Agent, or Firm* — AlbertDhand LLP (57) ABSTRACT

Methods, devices and computer program products facilitate self-configuration and self-optimization of radio networks. An internal topology discovery is performed to assess characteristics of a plurality of access points within an internal network. An external cell discovery can also be performed to identify one or more access points operating within an external network. Based on the assessments obtained through the internal and/or external topology discovery processes, operational parameters are assigned to each access point within the internal network. Such operational parameters can include a transmit power associated with each radio node.

35 Claims, 7 Drawing Sheets

FIG. 7

# METHOD, SYSTEM AND DEVICE FOR CONFIGURING TOPOLOGY OR A WIRELESS NETWORK

RELATED APPLICATIONS

This application claims the benefit of priority to provisional patent application 61/265,700, filed Dec. 1, 2009.

FIELD OF INVENTION

The present invention relates generally to the field of wireless communications. More particularly, the present invention relates to providing autonomous optimized topology for a wireless network.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

In cellular networks, access points (APs), also sometimes referred to as base stations and/or Node Bs, comprise a receiver/transmitter that operates as the hub of local wireless network, and may also be the gateway between a wired network and the wireless network. The terms access point, base stations and Node B are used in the present application interchangeably and are not intended to be limited to a specific type of access point or a particular communication protocol. APs are normally installed and commissioned after a careful upfront planning and survey process, which is followed by extensive post installation optimization efforts to maximize the network performance. Such optimization efforts also usually involve a considerable amount of manual intervention that could include "drive testing" using specialized measurement devices to collect data on network performance at a variety of geographical locations. This data is then post-processed and analyzed to determine inputs for optimization. These optimization steps typically involve power adjustments, antenna tilt adjustments and the like.

While such prior planning, installation and post-installation efforts may be effectively carried out for small networks that provide coverage to easily accessible physical locations, they become very expensive for networks that may comprise complicated physical spaces spanning multiple floors of a building, including elevator shafts, stairwells, atria, meeting rooms, etc. Further, this expensive process may reasonable for macro networks, where a single cell may cover a large area (e.g., several square kilometers). In macro networks, the cost of the equipment, site establishment (including licensing), and per-cell operating expenses (and revenue) far exceed the planning and post-installation verification processes. But for small-cell (e.g., local area) networks, these traditional costs are orders of magnitude smaller and, therefore, an expensive site survey and post-installation validation and/or tuning process may not be economically feasible. In particular, the business case for an expensive installation process often fails when the network consists of a large number of small cells that cover an area much smaller than cells in macro (wide-area) networks. For example, the cost of installation procedures may be prohibitive in enterprise networks that are described herein, as well as applications that relate to high-density capacity enhancements of a downtown city square and ad-hoc deployment of a cellular network such as in military applications. Therefore, there is a need to provide simple and cost-effective methods for installation and on-going optimization of access points within a wireless network.

SUMMARY OF THE INVENTION

The disclosed embodiments relate to systems, methods, devices, and computer program products for providing a self-configuring and self-optimizing wireless access network. One aspect of the disclosed embodiments relates to a method comprising performing internal topology discovery to assess characteristics of a plurality of access points within an internal network, and assigning operational parameters to each access point within the internal network. In one embodiment, the method further comprises performing external cell discovery to identify one or more access points operating within an external network. For example, the external cell discovery includes configuring all access points within the internal network to operate in monitoring mode, and instructing each access point within the internal network to conduct a scan to obtain a plurality of parameters associated with the one or more access points within the external network.

According to one embodiment, the plurality of parameters comprises primary scrambling code and signal strength associated with the one or more access points within the external network. In yet another embodiment, the internal topology discovery includes configuring a selected access point within the operational internal network to operate in an operational mode, configuring all access points, other than the selected access point, within the internal network to operate in a monitoring mode, and generating one or more neighbor lists in accordance with information obtained from the access points within the internal network operating in operational mode. In one variation, the selected access point is configured to operate using a particular primary scrambling code and the information obtained from the access points comprises an indication as to whether or not the particular primary scrambling code is detected. In another embodiment, each access point that produces information comprising the indication is placed on a neighbor list of the selected access point.

In another embodiment, only a particular number of access points that produce information comprising the indication are placed on a neighbor list of the selected access point. In this embodiment, the particular number of access points placed on the neighbor list of the selected access point correspond to those access points that have detected the selected access point with strongest signal strengths. In another embodiment, each access point that produces information comprising the indication places the selected access point on its neighbor list. In still another embodiment, each access point that produces information comprising the indication considers the selected access point a candidate access point for placement on its neighbor list. In such an embodiment, only a particular number of candidate access points are placed on the neighbor list of each access point that produces information comprising the indication. For example, the particular number of candidate access points placed on the neighbor list correspond to those candidate access points that are detected with strongest signal strengths.

According to one embodiment, the particular primary scrambling code is selected based on information obtained during an external cell discovery operation. In another embodiment, the operational parameters that are assigned to each access point comprise a primary scrambling code. In a certain embodiment, the assigning of the primary scrambling code for each access point within the internal network is carried out in accordance with a pre-defined assignment hierarchy. In one variation, the pre-defined assignment hierarchy is configured to minimize interference among access points within the internal network. In another variation, the pre-defined assignment hierarchy is configured to minimize handoff ambiguity to and/or from the internal network.

In another embodiment, the operational parameters that are assigned to each access point comprise a transmit power level associated with each access point within the internal network. In one example embodiment, the transmit power level is assigned to a particular access point within the internal network at least based on periodic measurement reports obtained from one or more user equipment. In another variation, the transmit power level is assigned to a particular access point within the internal network at least based on event-based measurement reports obtained from one or more user equipment. In another example embodiment, the transmit power level is updated on an on-going basis in accordance with the periodic measurement reports. In another embodiment, a number of periodic measurements made by the one or more user equipment are processed to produce a condensed set of information, and the transmit power level is updated based on the condensed set of information.

According to another embodiment, the periodicity of the periodic measurements are varied depending on the number of user equipment in the internal network. In still another embodiment, the periodicity of the periodic measurements is varied in accordance with how close information provided in the periodic measurement reports are to a desired coverage threshold. In another embodiment, the assigning of the transmit power is carried out to provide a target network coverage for an area within the internal network.

In yet another embodiment, the assigning of the transmit power is carried out in accordance with measurements conducted during an external cell discovery. According to another embodiment, the assigning of the transmit power is carried out in accordance with one or more measurements reports obtained from one or more user equipment, while according to another embodiment, the assigning of the transmit power is carried out to minimize interference with external networks. In still another embodiment, the transmit power level is made in accordance with measurement results obtained during the external cell discovery and the internal topology discovery.

According to one embodiment, assigning the transmit power level comprises configuring a list of user equipment identification information, selecting one or more user equipment from the list of user equipment, sending a measurement command to the one or more user equipment, receiving a plurality of measurement reports from the one or more user equipment, and assigning the transmit power level based on the plurality of received measurement reports. According to another embodiment, assigning the transmit power level comprises selecting one or more user equipment that correspond to actual users of the internal network, sending a measurement command to the one or more user equipment, receiving a plurality of measurement reports from the one or more user equipment, and assigning the transmit power level based on the plurality of received measurement reports. In another embodiment, the plurality of measurement reports are obtained during a physical walk-through an intended coverage area of the internal network.

In one embodiment, the internal network comprises at least one central access controllers and one or more access points. In this embodiment, the at least one central access controller performs at least a portion of the internal topology discovery or the assignment of operational parameters. In another embodiment, the internal network comprises peer access points without a central access controller, and one or more peer access points perform at least a portion of the internal topology discovery or the assignment of operational parameters in a distributed manner. In such a distributed system, the user equipment making the measurements are selected to maximize coverage across the internal network. In another embodiment, the user equipment making the measurements are selected dynamically in time to maximize a battery life of the user equipment within the internal network. In still another embodiment, each peer access point receives measurements from each user equipment connected to it, and each such peer access point exchanges the measurements that it receives with neighboring peer access points in the internal network, to thereby distribute information within the internal network. In yet another embodiment, transmit power decisions made autonomously by each peer access point are distributed to neighboring peer access points to allow each peer access point to compute the internal topology discovery.

Another aspect of the disclosed embodiments relates to an apparatus, comprising a processor, and a memory comprising program code, the program code configured to work with the processor and cause the apparatus to perform internal topology discovery to assess characteristics of a plurality of access points within an internal network, and assign operational parameters to each access point within the internal network.

Another aspect of the disclosed embodiments relates to a computer program product, embodied on a computer readable medium, comprising program code for performing internal topology discovery to assess characteristics of a plurality of access points within an internal network, and program code for assigning operational parameters to each access point within the internal network.

These and other advantages and features of the disclosed embodiments, together with the organization and manner of operation thereof, will become apparent from the following detailed description when taken in conjunction with the accompanying drawings.

BRIEF DESCRIPTION OF THE DRAWINGS

Embodiments of the invention are described by referring to the attached drawings, in which.

DETAILED DESCRIPTION OF CERTAIN EMBODIMENTS

In the following description, for purposes of explanation and not limitation, details and descriptions are set forth in order to provide a thorough understanding of the provided embodiments. However, it will be apparent to those skilled in the art that the present invention may be practiced in other embodiments that depart from these details and descriptions.

Figure 1:
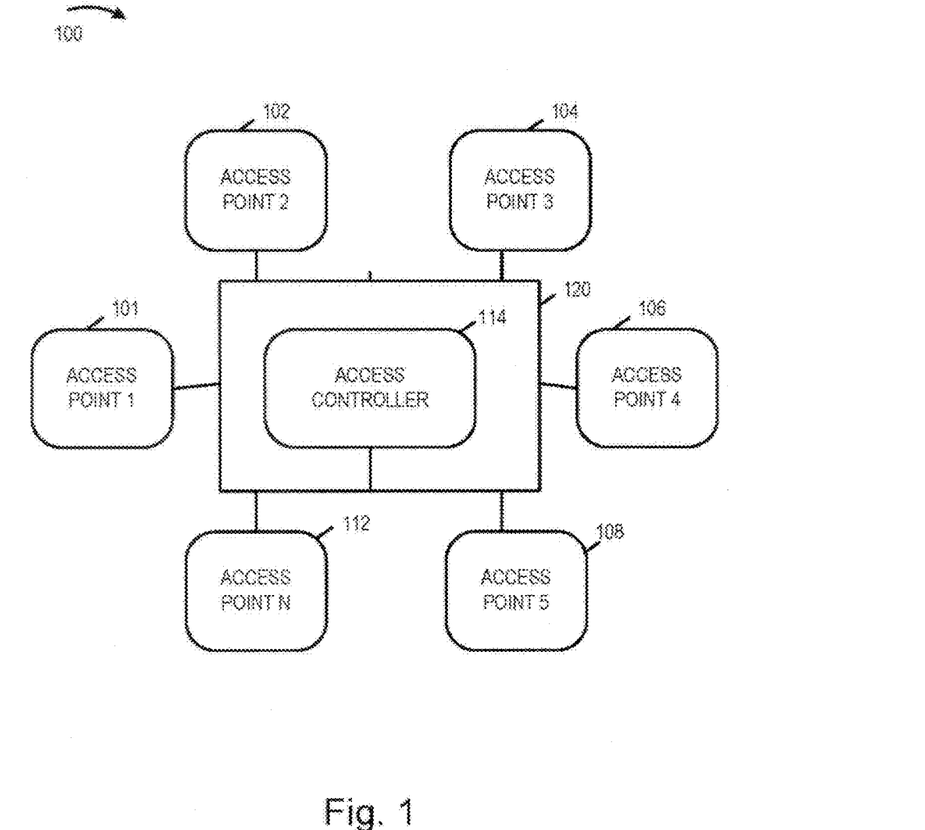
FIG. 1 illustrates exemplary components within a network that may be used in different embodiments.

FIG. 1 illustrates an exemplary system 100 which may be used to accommodate some or all of the disclosed embodiments. The system 100 includes a plurality of access points referenced as 101, 102, 104, 106, 108 and 112. The access points that are illustrated in FIG. 1 are connected, directly or indirectly, to an access controller 114 through connection 120. Each of the access points 101, 102, 104, 106, 108 and 112 is herein referred to as an "internal access point." Each internal access point may communicate with a plurality of user equipment (UE), as well as other access points. It should be noted that while FIG. 1 illustrates a single central controller 114 that is distinct from the access points, it is also possible that the access controller is implemented as part of one or more access points. Further, the disclosed embodiments may also be implemented using a peer-to-peer network of access points, where each access point can initiate certain transmissions, including commands and/or data, to other access points without the involvement of a central controller.

The exemplary block diagram that is shown in FIG. 1 is representative of a single network that is adjacent to, or is partially overlapping with, other networks. The collection of these other networks, which may comprise macro-cellular networks, femtocell networks and the like, are herein referred to as the external networks. Each "external network" may comprise one or more access controllers and a plurality of "external access points".

As noted earlier, the installation and tuning of the various access points within a macro cellular network has traditionally been conducted by undertaking extensive RF mapping and RF planning, drive tests using specialized measurement devices and manual configuration. The various disclosed embodiments provide enhanced capabilities for assessing and configuring the topology of a network in a cost-effective autonomous manner.

In one embodiment, the presence and signaling parameters associated with external cells are determined in order to facilitate hand-in/hand-out from/to different cells or networks. For example, in one embodiment, all or some of the external neighboring cells of a particular internal network or internal cell are identified. In another embodiment, the local topology of an internal cell is determined, thus identifying, for example, which particular internal cells are situated close to other cells. This mapping of the internal network topology may be used to generate neighbor lists that facilitate handoffs within the internal network.

In another embodiment, primary scrambling codes (PSC's) are assigned to each internal cell to minimize downlink interference across both internal and external cells. For example, in the downlink channel of WCDMA, a unique primary scrambling code, chosen among the available 512 primary scrambling codes, has to be assigned to each cell of the network under consideration. Due to the limited number of PSCs, the re-use of PSC's within the internal network as well as between internal and external networks must be taken into account when assigning PSCs to particular cells. According to an example embodiment, whenever possible, identical PSCs are not assigned to different first-tier neighbors of the same internal or external cell. In some embodiments, the PSC assignment is carried out to minimize handoff ambiguity. To this end, the same PSC is not assigned within, for example, two tiers of neighbors. In another embodiment, transmit power levels of each internal cell are determined by balancing factors such as complete radio coverage over the area served by the cell against the bleed-out into external networks.

To provide these and other features associated with the various embodiments, the network access points are configured to make measurements of the broadcast transmissions made by other access points within the internal network, as well as in external cells. In particular, broadcast transmissions that are mandated by, for example, UMTS R99, Rels. 5 to 9, as well as future 3GPP standard drafts may be used without modification to acquire the necessary measurement information. The U.S. patent application Ser. No. 12/487,277, titled "METHODS AND APPARATUS FOR COORDINATING NETWORK MONITORING AND/OR AUTOMATING DEVICE CONFIGURATIONS BASED ON MONITORING RESULTS," which claims the benefit of the filing date of U.S. provisional application No. 61/073,747 filed on Jun. 18, 2008, and is assigned to the present assignee, describes example techniques related to conducting certain measurements through broadcast information transmissions. These applications are hereby incorporated by reference in their entirety. It should be noted that the disclosed embodiments are similarly applicable to other standards, including, but not limited to CDMA2000, WiMAX IEEE 802.16, and 3GPP LTE.

Once the measurements are made, a controller, such as the central controller that is depicted in FIG. 1, may be used to coordinate the measurements made by the access points, such that the final set of measurements are collated easily for processing in accordance with the algorithms that are described below. The processing algorithms derive information about the internal topology and the external or neighboring networks and produce the so-called internal and external "neighbor lists." These lists comprise identification information corresponding to the first- and second-tier neighbors of each access point within both the internal and external networks. For example, this identification information may comprise both the received signal strengths from each access point, as well as protocol signaling parameters. Based on the pooled measurement information, and the neighbor lists, primary scrambling codes (PSC) may be assigned to internal access points. The assignment is carried out to minimize the downlink interference between internal access points, as well as between the internal and external cells. Further, the assignment of the same PSC to different first-tier neighbors of the same (external or internal) cell is avoided.

According to another embodiment, the standards-mandated measurement reporting capability of the UEs is utilized to configure a subset of UEs to deliver periodic measurement reports to their serving access points. This provides an accurate sampling of the propagation conditions within the deployment region at locations where users are expected to be present. The periodic measurement reporting, unlike events-based reporting, provides an unbiased sampling of the propagation environment, regardless whether the RF conditions are good, bad, changing, or nearly static. Due to the periodic nature of these measurements, however, the data associated with the on-going measurements may become too large for efficient handling and/or storage. Therefore, according to another embodiment, the information obtained from a number of measurements are processed and condensed into a critical set of measurements that is sufficient to assign transmit powers to the access points to satisfy the desired operating conditions. The computational and storage requirements associated with such processing can be kept relatively small by processing the incoming measurement data on-the-fly.

According to another embodiment, the above-noted critical set of UE measurements are processed to produce a set of assigned transmit powers for all access points and to identify possible coverage "holes" in the network. In particular, coverage holes can be identified by noting the locations where a transmit power assignment cannot satisfy the desired operating conditions for a particular critical point. Once the initial power assignment has taken place, the periodic UE measurements may be used to subsequently reassign transmit powers to different access points. Furthermore, subsequent, but infrequent, full scanning may be carried out to refresh the system's knowledge of internal and external cells and neighbors.

Using some or all of the above-noted embodiments, together with stored operating and topology information, it is possible to quickly recover from system-wide shutdowns, such as power outages, without repeating the entire topology-discovery and measurement procedures. In addition, since the topology and access point characteristics of the network is known, new access points may be readily added and certain access points may be readily deleted from the network. It should be also noted that the disclosed embodiments provide a detailed assessment and automated configuration of the access network with no, or little, human involvement. In addition, they provide inter-cell coordination that is necessary to pool and process the collected information to obtain the topology information and optimized parameter settings for the network components.

Figure 2:
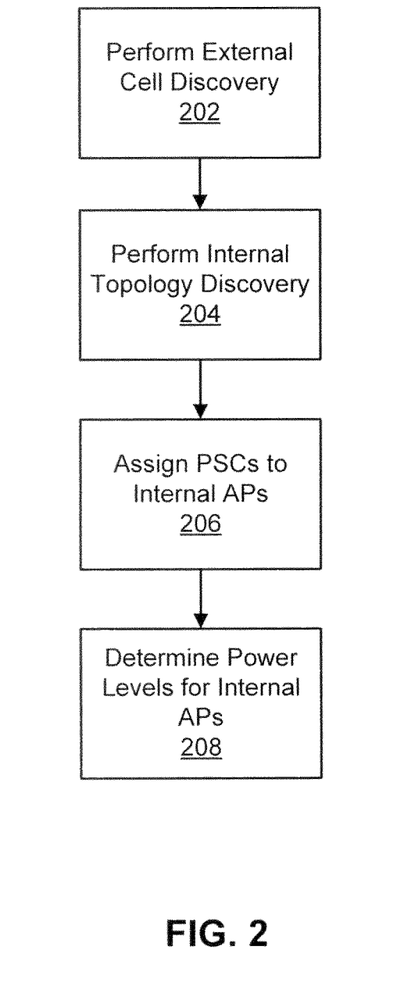
FIG. 2 illustrates a block diagram of an example embodiment

FIG. 2 illustrates a flow chart describing the various steps that may be carried out for assessing and configuring a network in accordance with an example embodiment. In Step 202, external cell discovery takes place. This step involves using one or more access points to assess the presence and strength of cells or radio nodes in external networks. In Step 204, internal topology discovery is conducted. To carry out this step, one or more access points are used to assess the presence of internal cells and to create neighbor lists associated with individual access points within the internal network. In Step 206, primary scrambling codes are assigned to individual access points within the internal network. The PSC assignment is designed to minimize the downlink interference between the access points, and to minimize handoff ambiguity. In Step 208, transmit power levels for each of the internal access points is determined. This step may be carried out to allow proper operation of network based on desired coverage criteria. Power allocation may based on different coverage scenarios that can occur in the network. In one scenario, access points may have too little power, leading to a "coverage hole." In another scenario, neighboring access points may transmit at an unnecessarily high power level, thereby interfering with the transmissions of neighboring access points across an area larger than the intended zone of coverage. The power levels may also be re-adjusted based on periodic measurements by one or more UEs that may be carried out on an on-going basis.

Figure 3:
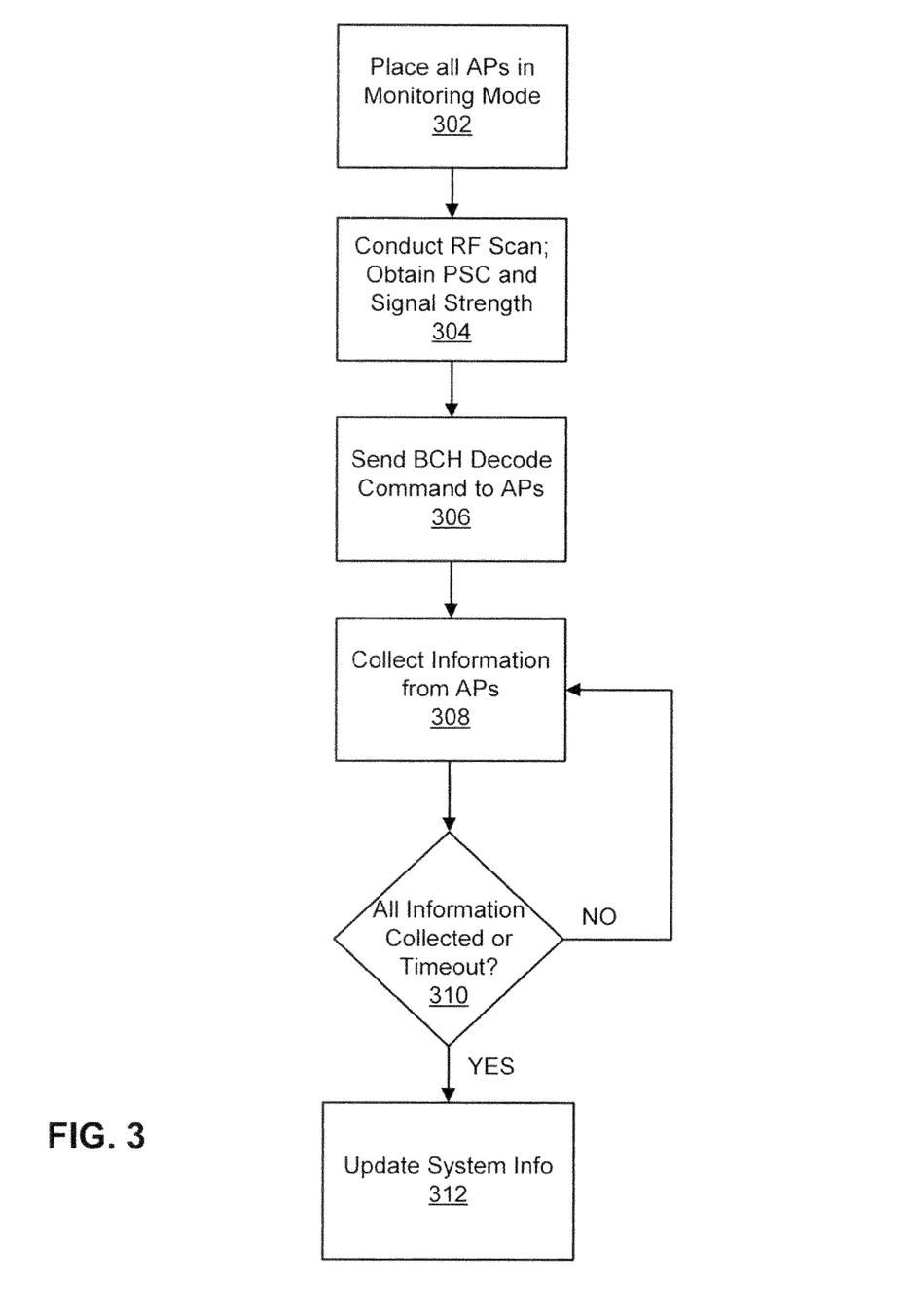
FIG. 3 illustrates is a flow diagram for external cell discovery in accordance with an example embodiment.

As described above, one feature of the disclosed embodiments relates to discovering external cells. The following provides an example procedure for making such discovery that utilized a central controller. However, as noted earlier, it is entirely possible to effect this and other embodiments using a network topology that comprises merely of peer access points, and/or one or more controllers that reside within one or more access points. FIG. 3 illustrates a flow diagram for performing external cell discovery in accordance with an example embodiment. In Step 302, all access points are placed in monitoring mode at the same time. While in monitoring mode, the access point monitors and collects information on signals sent to and/or transmitted by, one or more access points, e.g., access points that are in operational mode of communication. Since all internal access points are intentionally placed in the monitoring mode, all incoming information collected by the internal access points thus correspond to the access points from external networks.

In Step 304, each access point (that is now in monitoring mode) performs an RF scan that returns detected PSCs and the associated measured signal strengths that are detectable from external networks. This information is received at the controller. In Step 306, the controller transmits a command to each access point to successively lock onto each of the detected PSCs and decode the broadcast channel (BCH) of the detected external cell. In an alternate embodiment, the controller does not have to transmit a command to each access point for BCH decoding, but rather each access point autonomously decodes the BCH for any detected PSC. BCH decoding is done in parallel by each of the access points within the internal network. In one example embodiment, instead of allowing all access points to simultaneously perform the decoding, the decoding process may be throttled by allowing only up to N access points to work in parallel.

In an example embodiment, the BCH decode process may be bypassed by having a user/operator provision a set of external cells and their signaling parameters comprising their identities. For example, if each external cell is assumed to have a unique PSC, then this provisioning may be carried out by (a) listing each external cell as a neighbor of every internal cell, or (b) configuring each internal cell to only perform the PSC detection and measurement to discover the neighboring external cells and their (measured) signal strengths.

Figure 4:
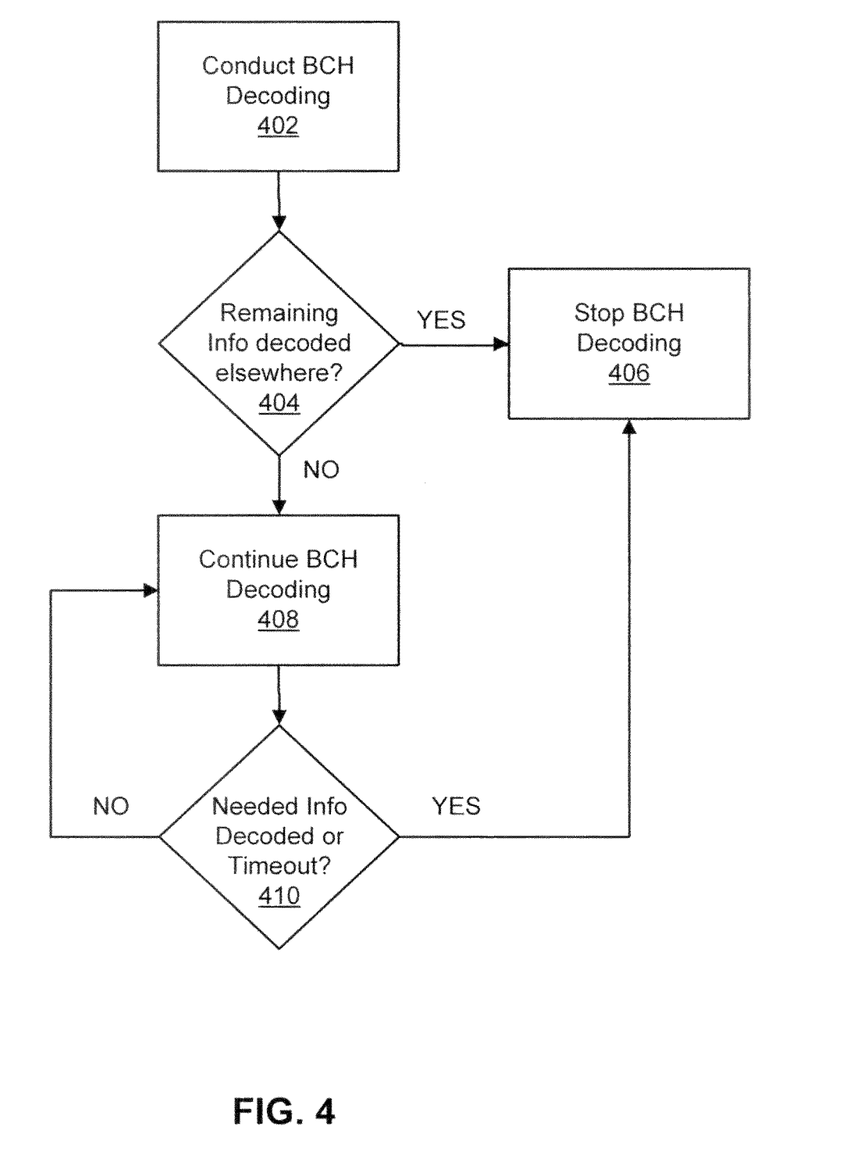
FIG. 4 illustrates is a flow diagram for BCH decoding in accordance with an example embodiment.

FIG. 4 is another flow chart that illustrates a set of exemplary steps that may be carried out by each access point in response to the command issued in Step 306. In Step 402, BCH decoding is conducted until at least a unique set of identifiers is determined from that broadcast channel. For example, for each known channel frequency and a particular PSC, a unique identifier comprising a radio network controller identification (RNC ID) and a cell identification (CID) may be obtained. In Step 404, it is determined if another access point has already decoded the remaining broadcast information associated with this particular RNC ID and CID. If the information has already been decoded, in Step 406, BCH decoding stops. If, on the other hand, the necessary information has not been decoded by other access points, the process is directed to Step 408, where BCH decoding continues until all needed information is decoded. For example, the needed information may comprise Public Land Mobile Network Identification (PLMN ID), primary common transmit channel (PCPICH), transmit power and neighbor PSCs in use. In Step 410, it is determined if all the needed information is decoded or a time-out condition has occurred. If the answer is yes to either of the above condition, the process is terminated in Step 406, otherwise, the process returns to Step 408 to continue with the BCH decoding.

Referring back to FIG. 3, in Step 308, the controller collects the decoded information obtained from the various access points. In step 310, it is determined if all the needed information has been collected for all external cells that were detected by at least one access point or their attempts to do so have resulted in a time-out failure. If neither of the two conditions are satisfied, the process returns to Step 308, otherwise, in Step 310, system information is updated. The update may comprise adding the detected external cells to the relevant neighbor lists of the individual internal cells. At the end of this process, information relevant to hand-in and hand-out between internal cells and external cells is available and the measured signal strengths of each external neighbor for each access point are also known.

Once the external discovery process has been completed, the internal topology of the network may be determined. FIG.

5 is a block diagram that illustrates how this task may be accomplished in accordance with an example embodiment. In Step 502, a single PSC is selected. This step may be carried out with the help of information obtained during the above-described external cell discovery. For example, a particular PSC may be selected such that the maximum received signal code power (RSCP) measured over all access points is minimized. More specifically, if a PSC was not detected by any of the access points, that particular PSC is selected. Failing to find such an undetected PSC, a PSC that has not been strongly detected by any of the access points during the external discovery is chosen. In Step 504 of FIG. 5, one access point is selected and placed in the operational mode while the remaining access points in the internal network are placed in the monitoring mode. In an alternate embodiment, more than one access point may be configured to operate in the operational mode to allow faster internal topology discovery. In one example scenario, the remaining access points that are still monitoring determine whether they can detect the additional access point that just become operational. If the detection is made, the detecting access point is considered a first-tier neighbor of the transmitting access point (and vice versa). In another variation, a similar detection procedure is carried out while two or more access points with different PSCs are simultaneously placed in the operational mode. The groups of operational access points selected for simultaneous transmission may be chosen, for example, at random or based on the discovered external topology so that they are unlikely to be neighbors. In Step 506, each monitoring access point is commanded to scan for and measure PSCs. This command may be issued by a controller, such as the access controller that is depicted in FIG. 1.

Figure 5:
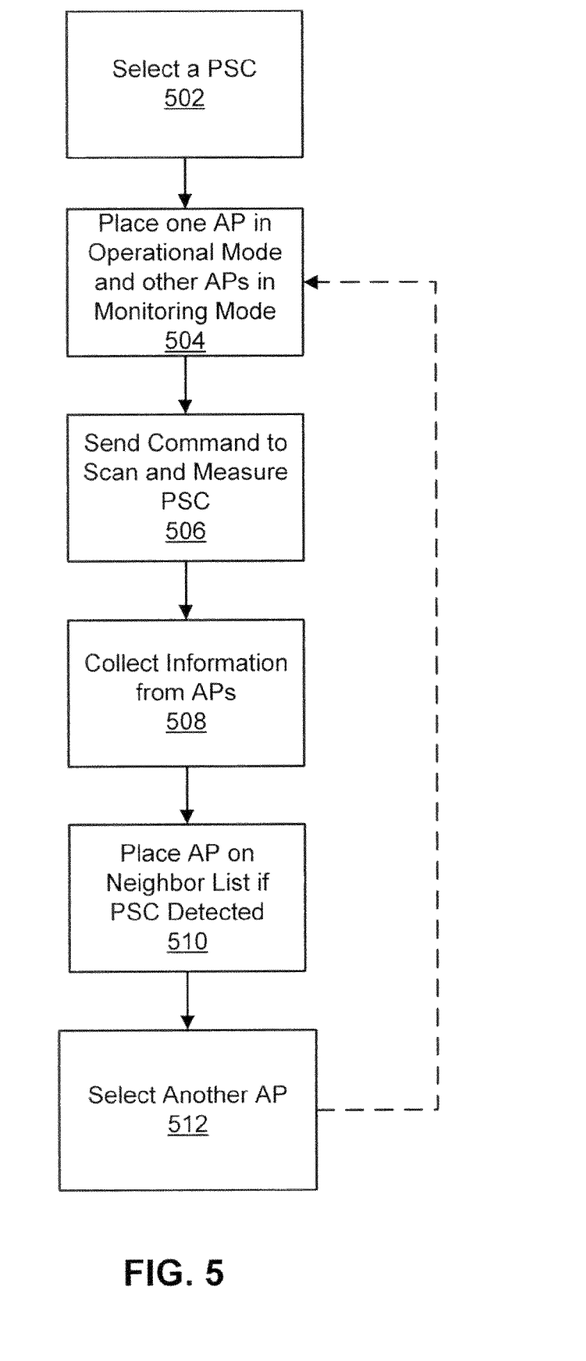
FIG. 5 illustrates is a flow diagram for internal topology discovery in accordance with an example embodiment.

In Step 508, the controller collects information from the access points. In Step 510, if an access point has detected the PSC that was selected in Step 502, the corresponding neighbor lists are updated to indicate that the access point which has made the detection is a first-tier neighbor of the operational access point that was selected in Step 504. This update necessarily includes adding the operational access point to the neighbor list of the access point(s) that made the detection, but it may also include, based on RF reciprocity, updating the neighbor list of the operational access point to include the access point(s) that made the detection. It should be noted that an ambiguity may arise if a monitoring access point which had previously detected the PSC during the external discovery process makes the detection during the internal discovery. In one embodiment, the controller may decide to mark the operational access point as a first-tier neighbor if the newly measured PSC strength exceeds the one found during the external discovery process by a particular threshold.

Referring back to FIG. 5, in Step 512, a different access point is selected, and the process returns to Step 504. As such, the process is repeated for every access point in the system or until all neighbor lists have been properly populated. At the end of the process, all first-tier internal neighbors of every access point is known (i.e., the internal topology has been determined). In addition, during this process, the signal strengths between each internal neighbor have also been measured. Since the transmit power that was used in known, the RF pathloss is also known. In addition, the internal neighbors may be included in the neighbor lists for each access point, which in turn, enables soft handoff within the network.

Keeping just a single access point operational during internal topology discovery addresses a complicated issue that is illustrated by the following example. Assume two operational access points are assigned the same PSC, and a third access point is placed in the monitoring mode. If the third access point is in range of the other two, it will detect and report only the stronger access point, with no indication that there is a second neighbor with the same PSC. This situation would result in an incomplete neighbor list, which could produce handoff problems, and create unnecessarily high interference levels between second-tier cells. These problems are readily solved by the above-described example embodiment that places a single access point in the operational mode during the internal topology discovery. It should be also noted that since only one access point is operational at any time during internal topology discovery in this exemplary embodiment, the order in which the various access points are selected is unimportant. As noted above, however, according to other embodiments, a monitoring access point may be able to disambiguate between two or more operational access points that are transmitting simultaneously with the same or different PSCs. Theses operational access points may be internal access points, external access points, or a combination of both internal and external access points.

Another embodiment relates to assigning PSCs to each internal cell. The set of assignable PSC's may be significantly smaller than the number of access points and, therefore, any assignment scheme must consider the possibility of considerable re-use of the PSCs. This could be particularly true if the deployment of the network consists multiple buildings with different PSCs in use by the neighboring external Node Bs. Furthermore, wherever possible, it must be ensured that PSC's are not assigned within two tiers of each other. If this condition is violated, an access point may end up having two different first-tier neighbors that use the same PSC. Such a scenario is likely to cause a number of handoff problems to/from that particular access point and its neighbors. However, the information necessary to make the proper PSC assignments are readily available from the information collected during the above-described external and internal topology discovery processes. In particular, the measured results and decoded results from Step 302 to 308 of FIG. 3 potentially includes the PSCs that are used by the neighbors of the external neighbor cells—i.e., the second-tier external neighbors. In addition, the measured results from Step 508 in FIG. 5 provide the needed information related to the internal access points.

According to an example embodiment, PSC's are assigned to the internal access points according to the following example hierarchy, proceeding serially in arbitrary order through the access points:

(1) A PSC not yet assigned to any access point in the internal network, and one which is not used in the first- or second-tier neighbors.

(2) A PSC assigned to at least one access point in the internal network, but one which is not used in the first- or second-tier neighbors. In case of a tie between two or more PSCs, the PSC that is thus far assigned the fewest number of times to the internal access points is selected.

(3) A PSC used in the second-tier neighbors but not used in the first-tier neighbors. In case of a tie between two or more PSCs that are used in second-tier neighbors, the PSC that was detected by a first-tier neighbor with the smallest common pilot channel (CPICH) RSCP is selected.

(4) A PSC used in the first-tier neighbors. In case of a tie between two or more PSCs, the PSC detected with the smallest CPICH RSCP is selected.

Figure 6:
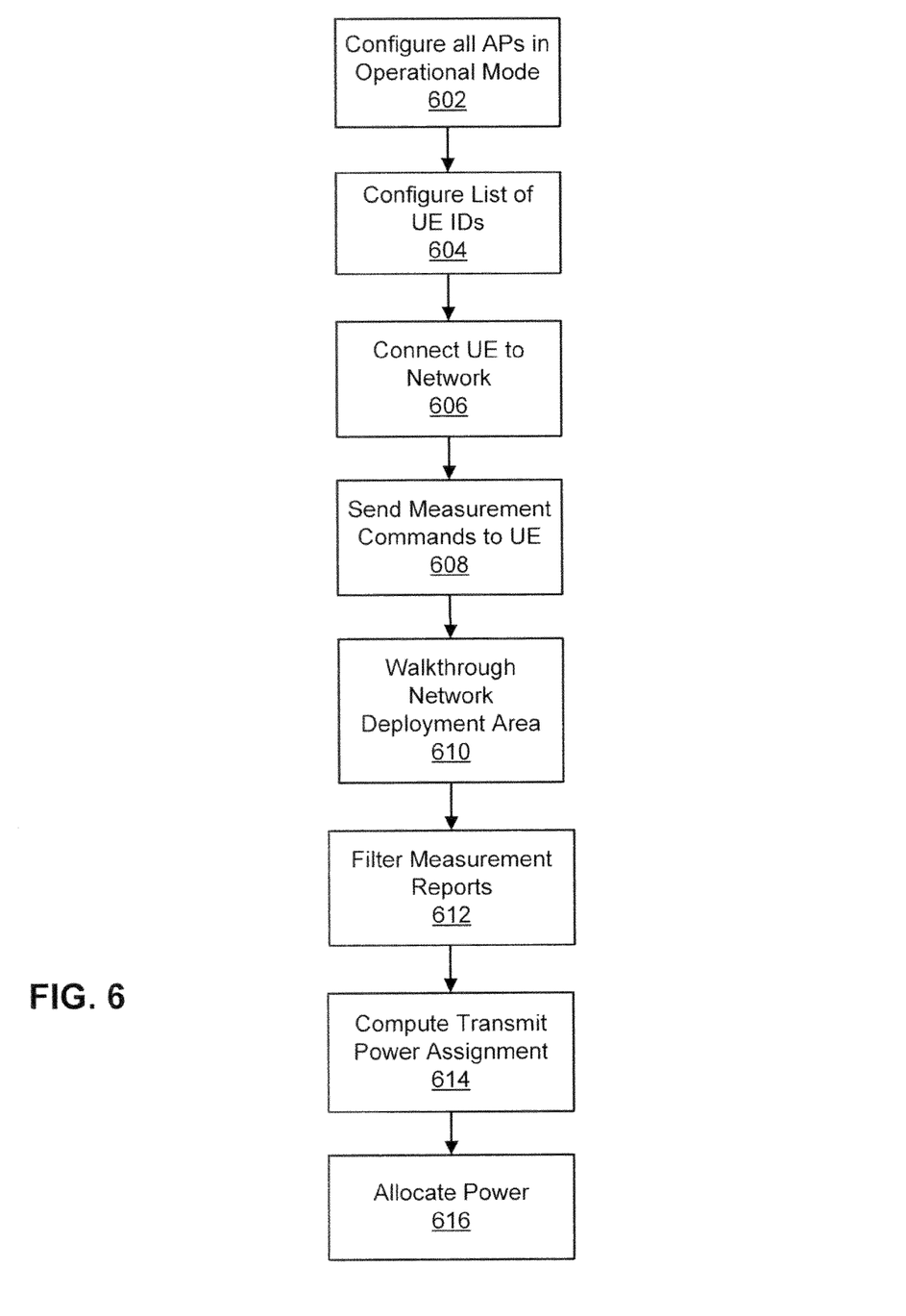
FIG. 6 illustrates is a flow diagram for power assignment in accordance with an example embodiment.

Another feature of the disclosed embodiments relates to determining transmit power levels for each internal cell. FIG. 6 is a block diagram for determining transmit power levels for internal cells according to an example embodiment. In Step 602, all access points within the internal network are configured to operate in the operational mode with either a default power assignment or one based on the measurements obtained from Steps 304 and 508 of FIGS. 3 and 5, respectively. In Step 604, a list of user equipment identification information, such as a list of International Mobile Subscriber Identities (IMSIs), is configured in the system. The list may be empty (i.e., with no IMSI's) or may include a wildcard (i.e., all IMSI's). In Step 606, an installer connects to the network using a UE with an IMSI that was included on the above-noted list.

In Step 608, measurement commands are sent to the UE with the listed IMSI. The measurement commands instruct the UE to send periodic measurement reports. The measurements may include information related to measured CPICH RSCP and/or CPICH Ec/No (i.e., the received energy per chip divided by the power density in the band) corresponding to a particular set of cells and their PSCs. These cells are typically the first-tier and possibly the second-tier neighbor cells in both the internal and external networks. The measurement commands that are issued to the UE in Step 608 instruct the UE to provide periodic measurement reports. Thus, unlike some event-based reports that are typically designed for handoff and active cell maintenance, periodic measurement reporting ensures a continuous sampling of the RF environment. In Step 610, the installer physically walks around the deployment area carrying the UE, which is now configured to send periodic measurement reports to the controller. According to an alternate embodiment, the installation walk-through is optional. Instead, the measurement results and the corresponding power adjustments are carried out over time based on measurement reports from true users. This may be carried out in accordance with several example embodiments. For example, in one embodiment, the subset of users chosen for periodic reporting may be chosen to maximize coverage across the network. In a similar, but distinct embodiment, the subset of users chosen for periodic reporting may be varied dynamically in time to maximize the battery life of the user terminals, and to prevent undue battery drain on a small subset of users. In another distinct embodiment, the periodicity of the measurement reports is varied depending on the number of user equipment in the system. In yet another distinct embodiment, the periodicity of measurement reports is varied depending on how close the measurement reports are to a desired coverage threshold. That way, the system could leverage more frequent measurements based on the confidence level of meeting the intended coverage targets.

In another distinct embodiment, each peer access point receives measurements from each user equipment connected to it, in which each peer access point exchanges the measurements that it receives with neighboring peer access points in the internal network, to thereby distribute information within the internal network. In return, the transmit power decisions made autonomously by each peer access point may be distributed back to neighboring peer access points to allow each peer access point to properly compute the internal topology discovery.

Returning to FIG. 6, in Step 612, the measurement reports are optionally filtered to produce a small set of critical measurement points that represent the most difficult areas of the deployment area in terms of adequacy of network coverage. It should be noted that the filtering that is carried out in Step 612 may be performed either before or after the completion of Step 614. In Step 614, the installer instructs the system to compute the transmit power assignment for all the access points within the internal network. In Step 616, the controller applies a power allocation algorithm based on the UE measurements that have been captured and optionally filtered. This results in the access points usage of newly computed power for CPICH, maximum total power, and possibly other channel power configurations. In making the above assessments, coverage target for the deployment of the network may be designed based on power measurements of the external cells that were carried out in Step 304 of FIG. 3. Further, power assignment may be premised based on an attempt to "cover" every measurement point using one of more access points.

Utilizing a central controller to conduct the assignments allows coordination and allocation of resources as needed. For example, an area may be covered by possibly selecting a single access point with the smallest pathloss, a single access point that does not have the smallest pathloss (e.g., if that access point needs a high power level to cover a different measurement point), or multiple access points potentially with a lower coverage target (e.g., corresponding to soft handoff gains). Further, the above-noted processes allow automatic identification and designation of coverage "holes" when an inability to cover a measurement point is observed. Also, as noted earlier, the disclosed embodiments may be carried out without the use of central controller, for example, by a peer group of access points.

Figure 7:
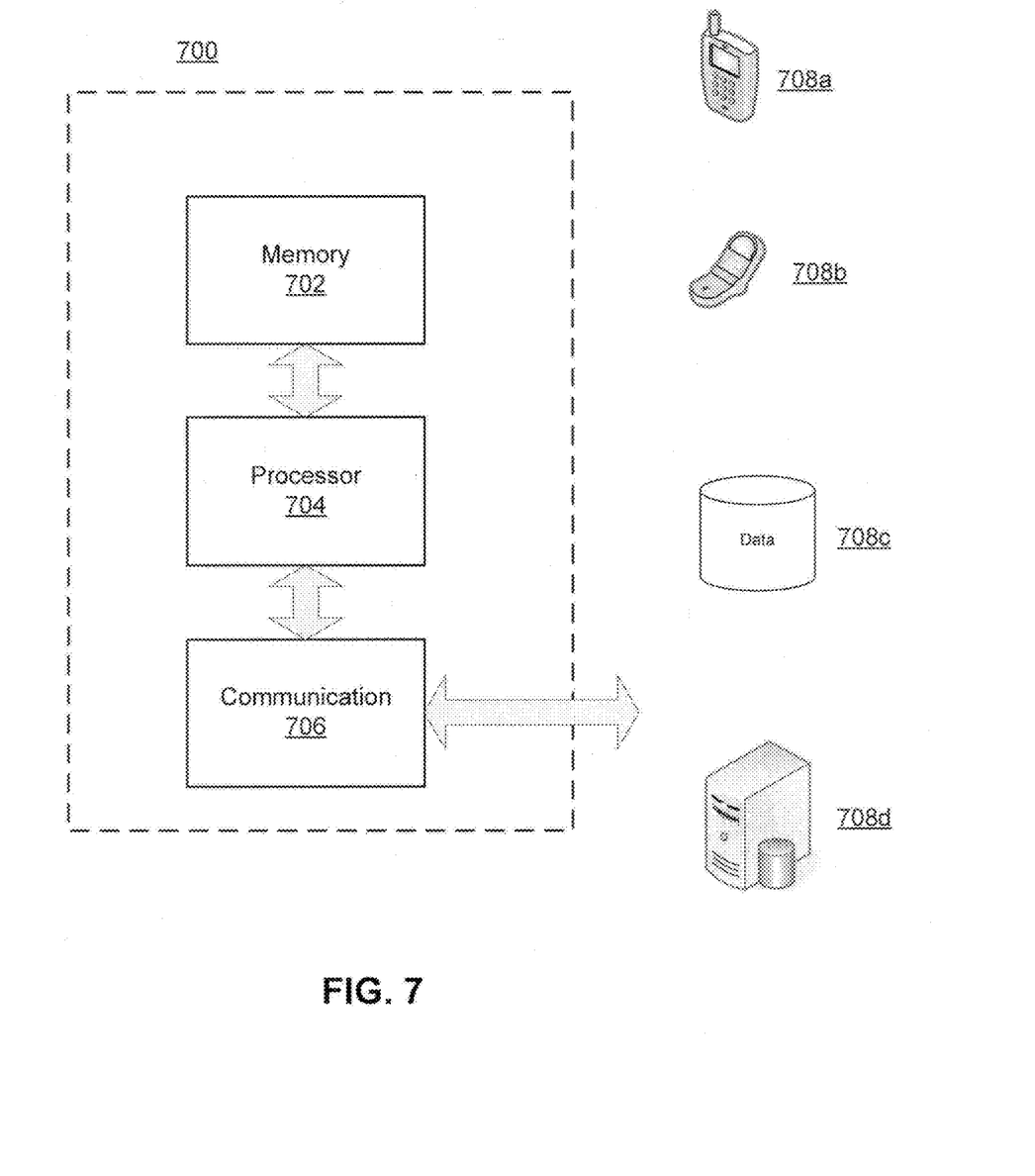
FIG. 7 illustrates a block diagram of an example device for implementing the various embodiments.

It is understood that the various embodiments may be implemented individually, or collectively, in devices comprised of various hardware and/or software modules and components. These devices, for example, may comprise a processor, a memory unit, an interface that are communicatively connected to each other, and may range from desktop and/or laptop computers, to consumer electronic devices such as media players, mobile devices and the like. For example, FIG. 7 illustrates a block diagram of a device 700 within which the various embodiments may be implemented. The device comprises at least one processor 704 and/or controller, at least one memory unit 702 that is in communication with the processor 704, and at least one communication unit 706 that enables the exchange of data and information, directly or indirectly, with other entities and devices, such as devices 708a through 708d that are depicted in FIG. 7. The communication unit 706 may provide wired and/or wireless communication capabilities in accordance with one or more communication protocols, and therefore it may comprise the proper transmitter/receiver antennas, circuitry and ports, as well as the encoding/decoding capabilities that may be necessary for proper transmission and/or reception of data and other information. The exemplary device that is depicted in FIG. 7 may be integrated into an access point hardware or may reside as a separate component within or outside the access point of a radio network. Additionally or alternatively, the exemplary device of FIG. 7 may be part of the access controller that is depicted in FIG. 1.

Similarly, the various components or sub-components within each module of the disclosed embodiments may be implemented in software, hardware, firmware. The connectivity between the modules and/or components within the modules may be provided using any one of the connectivity methods and media that is known in the art, including, but not limited to, communications over the Internet, wired, or wireless networks using the appropriate protocols.

Various embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes. In particular, the various steps that are described in the various block diagrams throughout this application are considered exemplary, and it is understood that the steps may be performed in different order than what is shown. In addition, fewer or additional steps may be included.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. For example, the various embodiments of the present invention may be implemented to wireless networks that operate based on Universal Mobile Telecommunications System (UMTS), including R99 and all high speed packet access (HSPA) variants, as well as other radio technologies such as 3GPP long term evolution (LTE), WiMAX and GSM. The embodiments discussed herein were chosen and described in order to explain the principles and the nature of various embodiments and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

What is claimed is:

1. A method, comprising:
   performing external cell discovery in an external network relative to an internal network;
   performing internal topology discovery to assess characteristics of a plurality of access points within the internal network; and
   performing self configuration and self optimization of the internal network by assigning operational parameters to each access point within the internal network based on the assessed characteristics of the plurality of access points, and the external cell discovery,
   wherein the external cell discovery includes:
      configuring all access points within the internal network to operate in monitoring mode; and
      instructing each access point within the internal network to conduct a scan to obtain a plurality of parameters associated with the one or more access points within the external network, wherein the plurality of parameters comprises primary scrambling code and signal strength associated with the one or more access points within the external network.

2. The method of claim 1, wherein the external cell discovery further includes identifying one or more access points operating within an external network.

3. The method of claim 1, wherein the operational parameters comprise a primary scrambling code.

4. The method of claim 3, wherein the assigning of the primary scrambling code for each access point within the internal network is carried out in accordance with a pre-defined assignment hierarchy.

5. The method of claim 4, wherein the pre-defined assignment hierarchy is configured to minimize interference among access points within the internal network.

6. The method of claim 4, wherein the pre-defined assignment hierarchy is configured to minimize handoff ambiguity to and/or from the internal network.

7. The method of claim 1, wherein the operational parameters comprise a transmit power level associated with each access point within the internal network.

8. The method of claim 7, wherein the transmit power level is assigned to a particular access point within the internal network at least based on periodic measurement reports obtained from one or more user equipment.

9. The method of claim 8, wherein the transmit power level is updated on an on-going basis in accordance with the periodic measurement reports.

10. The method of claim 8, wherein
    a number of periodic measurements made by the one or more user equipment are processed to produce a condensed set of information; and the transmit power level is updated based on the condensed set of information.

11. The method of claim 8, further comprising:
    varying a periodicity of the periodic measurements depending on the number of user equipment in the internal network.

12. The method of claim 8, further comprising:
    varying a periodicity of the periodic measurements in accordance with how close information provided in the periodic measurement reports are to a desired coverage threshold.

13. The method of claim 7, wherein the assigning of the transmit power is carried out to provide a target network coverage for an area within the internal network.

14. The method of claim 7, wherein the assigning of the transmit power is carried out in accordance with measurements conducted during an external cell discovery operation.

15. The method of claim 7, wherein the assigning of the transmit power is carried out to minimize interference with external networks.

16. The method of claim 7, wherein an initial assignment of the transmit power level is made in accordance with measurement results obtained during the external cell discovery and the internal topology discovery.

17. The method of claim 7, wherein assigning the transmit power level comprises:
    configuring a list of user equipment identification information;
    selecting one or more user equipment from the list of user equipment;
    sending a measurement command to the one or more user equipment;
    receiving a plurality of measurement reports from the one or more user equipment; and
    assigning the transmit power level based on the plurality of received measurement reports.

18. The method of claim 7, wherein assigning the transmit power level comprises:
    selecting one or more user equipment that correspond to actual users of the internal network;
    sending a measurement command to the one or more user equipment;
    receiving a plurality of measurement reports from the one or more user equipment; and
    assigning the transmit power level based on the plurality of received measurement reports.

19. The method of claim 17, wherein the plurality of measurement reports are obtained during a physical walk-through an intended coverage area of the internal network.

20. The method of claim 1, wherein
the internal network comprises at least one central access controllers and one or more access points; and
the at least one central access controller performs at least a portion of the internal topology discovery or the assignment of operational parameters.

21. The method of claim 1, wherein
the internal network comprises peer access points without a central access controller; and
one or more peer access points perform at least a portion of the internal topology discovery or the assignment of operational parameters in a distributed manner.

22. The method of claim 21, wherein the user equipment making the measurements are selected to maximize coverage across the internal network.

23. The method of claim 21, wherein the user equipment making the measurements are selected dynamically in time to maximize a battery life of the user equipment within the internal network.

24. The method of claim 21, wherein each peer access point receives measurements from each user equipment connected to it, and wherein said each peer access point exchanges the measurements that it receives with neighboring peer access points in the internal network, to thereby distribute information within the internal network.

25. The method of claim 22, wherein transmit power decisions made autonomously by each peer access point are distributed to neighboring peer access points to allow each peer access point to compute the internal topology discovery.

26. A method, comprising:
performing external cell discovery in an external network relative to an internal network;
performing internal topology discovery to assess characteristics of a plurality of access points within the internal network; and
performing self configuration and self optimization of the internal network by assigning operational parameters to each access point within the internal network based on the assessed characteristics of the plurality of access points, and the external cell discovery,
wherein the internal topology discovery includes:
configuring a selected access point within the internal network to operate in an operational mode, wherein the selected access point is configured to operate using a particular primary scrambling code;
configuring all access points, other than the selected access point, within the internal network to operate in a monitoring mode; and
generating one or more neighbor lists in accordance with information obtained from the access points within the internal network operating in operational mode, wherein the information obtained from the access points comprises an indication as to whether or not the particular primary scrambling code is detected.

27. The method of claim 26, wherein each access point that produces information comprising the indication is placed on a neighbor list of the selected access point.

28. The method of claim 26, wherein only a particular number of access points that produce information comprising the indication are placed on a neighbor list of the selected access point.

29. The method of claim 28, wherein the particular number of access points placed on the neighbor list of the selected access point correspond to those access points that have detected the selected access point with strongest signal strengths.

30. The method of claim 26, wherein each access point that produces information comprising the indication places the selected access point on its neighbor list.

31. The method of claim 26, wherein each access point that produces information comprising the indication considers the selected access point a candidate access point for placement on its neighbor list; and
only a particular number of candidate access points are placed on the neighbor list of each access point that produces information comprising the indication.

32. The method of claim 31, wherein the particular number of candidate access points placed on the neighbor list correspond to those candidate access points that are detected with strongest signal strengths.

33. The method of claim 26, wherein the particular primary scrambling code is selected based on information obtained during an external cell discovery operation.

34. An apparatus, comprising
a processor; and
a memory comprising program code, the program code configured to work with the processor and cause the apparatus to:
perform external cell discovery in an external network relative to an internal network;
perform internal topology discovery to assess characteristics of a plurality of access points within the internal network; and
perform self configuration and self optimization of the internal network by assigning operational parameters to each access point within the internal network based on the assessed characteristics of the plurality of access points, and the external cell discovery,
wherein the program code to perform external cell discovery includes program code to:
configure all access points within the internal network to operate in monitoring mode; and
instruct each access point within the internal network to conduct a scan to obtain a plurality of parameters associated with the one or more access points within the external network, wherein the plurality of parameters comprises primary scrambling code and signal strength associated with the one or more access points within the external network.

35. A computer program product, embodied on a non-transitory computer readable medium, comprising
program code for performing external cell discovery in an external network relative to an internal network;
program code for performing internal topology discovery to assess characteristics of a plurality of access points within the internal network; and
program code for performing self configuration and self optimization of the internal network by assigning operational parameters to each access point within the internal network based on the assessed characteristics of the plurality of access points, and the external cell discovery,
wherein the program code for performing external cell discovery includes:
program code for configuring all access points within the internal network to operate in monitoring mode; and
program code for instructing each access point within the internal network to conduct a scan to obtain a plurality of parameters associated with the one or more access points within the external network, wherein the plurality of parameters comprises primary scrambling code and signal strength associated with the one or more access points within the external network.

* * * * *

UNITED STATES PATENT AND TRADEMARK OFFICE
CERTIFICATE OF CORRECTION

| | | |
|---|---|---|
| PATENT NO. | : 8,644,193 B2 | Page 1 of 1 |
| APPLICATION NO. | : 12/957181 | |
| DATED | : February 4, 2014 | |
| INVENTOR(S) | : Brett Schein, Sayandev Mukherjee and Murari Srinivasan | |

It is certified that error appears in the above-identified patent and that said Letters Patent is hereby corrected as shown below:

Title Page, Item (54) and in the Specification, Column 1, line 1, title should be: --METHOD, SYSTEM AND DEVICE FOR CONFIGURING TOPOLOGY OF A WIRELESS NETWORK--.

Signed and Sealed this
Fifteenth Day of September, 2015

Michelle K. Lee
*Director of the United States Patent and Trademark Office*